Oct. 8, 1929.   C. R. KEEFER   1,730,431
COMBINED SPOOL HOLDER AND TENSIONER
Original Filed Oct. 6, 1924

Inventor,
C. R. Keefer.

Sterling P. Buck,
Attorney.

Patented Oct. 8, 1929

1,730,431

UNITED STATES PATENT OFFICE

CHARLES R. KEEFER, OF BALTIMORE, MARYLAND

COMBINED SPOOL HOLDER AND TENSIONER

Original application filed October 6, 1924, Serial No. 742,018. Divided and this application filed October 19, 1925. Serial No. 63,394. Renewed April 6, 1928.

This invention relates to spool-holders, and especially to the combined spool holder and tensioner described, but not claimed, in my application No. 742,018, resulting in Patent No. 1,558,179, this being a division of such application.

One object of the invention is to provide an exceedingly convenient, effective, and yet simple and comparatively inexpensive device for holding a spool with frictional resistance against rotating, yet permitting the spool to rotate with sufficient ease to properly pay out the thread or other material wound on the spool, in the operation of winding and twisting, or in any other operation where a device of this character is applicable.

A further object is to provide a spool-holding spindle with supporting means which permits adjustment of the spindle to various positions, that is, to various angles with respect to the supporting means; and to provide for securing the spindle in its various angular positions.

A further object is to provide a spring pressed spool-retaining element which is capable of being passed through any spool which can be journaled on the spindle, and which is mounted for turning through an angle of 90°, so it can not then pass through the spool, but serves as an effective means to hold the spool on the spindle.

Other objects and important features are pointed out or implied in the following details of description, in connection with the accompanying drawing in which:—

Referring to these drawings in detail, in which similar reference characters refer to similar parts throughout the several views, and in which the spool s is shown merely to illustrate the use and operation of the device, the structure and arrangement of parts is as follows:—

Figure 1:
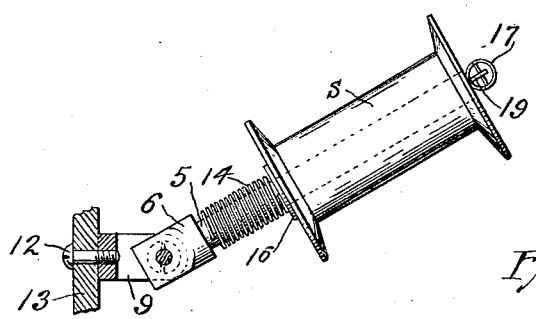
Figure 1 is a view partly in side elevation, and partly in section, showing the device with a spool mounted thereon.

A hollow spindle or spool-journal 5, preferably formed of a section of metal tubing, is threaded or otherwise secured in an apertured member 6, the aperture 7 of which receives a screw or pivot 8 which passes through two somewhat yielding ears 9 of a supporting element 10. These members 8 and 9 constitute a clamp, and on tightening the screw 8, the member or unit 5—6 can be held in an infinite number of angular adjustments with respect to the supporting member 9—10. The supporting member is preferably apertured and threaded at 11 for receiving the screw 12 which latter extends through a plate 13. This plate 13 corresponds to the plate 67 of the parent application (above referred to). By loosening the screw 8, the spindle 5 can easily be turned about the screw 8 for effecting its various angular adjustments. The diameter of the member 6, being greater than that of the spindle 5, such member 6 provides a seat against which a spring 14 may be seated, and the spring 14 may have one end soldered or otherwise secured to the unit 5—6, by solder, or by one end being turned inward through an opening 15, thereby preventing the spring 14 from being displaced when there is no spool on the spindle. A washer or friction-disc 16 is seated against the other end of the helical spring 14, and preferably secured thereto by solder or other appropriate means. The friction disc 16 is slidable along the spindle 5, so it can be moved into the position shown in Fig. 1 by placing a spool on the spindle.

Figure 2:
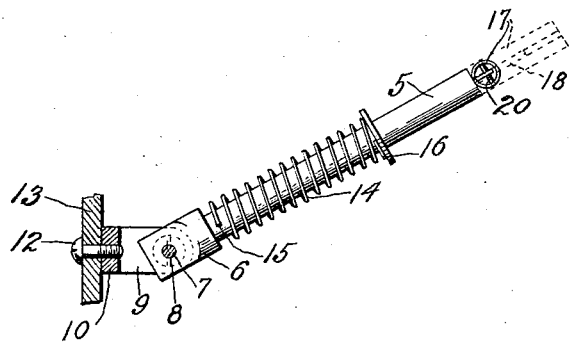
Fig. 2 is a view similar to Fig. 1 except the spool is omitted, the tensioning spring is extended, and the spool-retaining element is shown in dotted lines as well as in broken lines.
Figure 3:
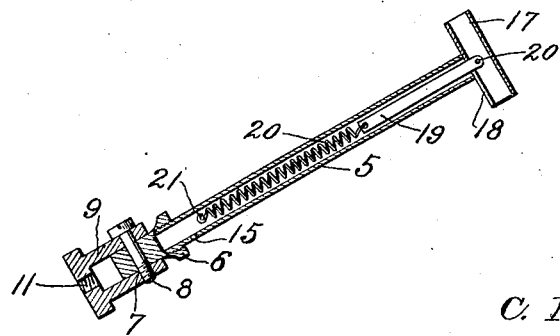
Fig. 3 is a central longitudinal sectional view, the section being taken at right angles to Figs. 1 and 2.

A tubular retaining element 17, preferably of the same cross-sectional shape and size as the spindle 5, is provided with a slot 18 through which a link 19 extends to a pivot 20. This pivot secures the members 17 and 19 to one another, at the same time permitting them to be swung through an angle of 90° with respect to one another, that is, permitting the member 17 to be swung from the spool receiving position, shown in dotted lines (Fig. 2), to the spool-securing position, shown in full lines in all three figures. A contractile spring 20 has one end secured to a link 19 while its other end is secured, at 21, to the tubular spindle 5. The pin 21 extends through a looped end of the spring 20 and through the spindle 5.

When it is desired to place a spool on the spindle, the tubular members 5 and 17 must first be in longitudinal alignment so the hollow of the spool can be passed over the member 17 and over the outer end of the member 5; and when it is desired to retain the spool on the spindle, the member 17 must be in the full line position, that is, lying at right angles to the length of the member 5.

It will be seen that this device has two tensioning springs, viz, the springs 14 and 20, and therefore, the spring 20 performs the dual function of (1) holding the member 17 in its spool-receiving and spool-retaining positions, and (2) serving as a tensioning device when the spindle has thereon a spool which is so long that it entirely compresses the spring 14 to its limit of elasticity, that is, to the condition in which its helices are against one another; so this feature permits the use of an unusually long spool or of two spools on the same spindle, while providing effective tensioning means therefor. Moreover, in view of the fact just previously explained, the spring 14 may be eliminated where the spool is so long as to abut against the member 6 or against the spool-seat 16 which may be adjustably secured to the spindle by means other than the spring 14.

Although the present drawings illustrate a very effective and practical form of spool holder, it is not my intention to limit the invention to the exact construction and arrangement here shown, but the inventive idea embraces other forms and combinations within the scope of the claims.

What I claim as my invention is:

1. In a spool-holder and tensioner, the combination of a tubular spool-journal, a tensioning spring thereon for pressing against one end of a spool thereon, a relatively long and narrow spool-securing member, a contractile spring having one end secured within the tubular journal, and means pivotally connecting said contractile spring to the middle part of said spool-securing member in such relation that the latter can be turned from its spool-securing position to a position that permits the spool to be passed thereover from said spool-journal.

2. In a spool-holder and tensioner, the combination of a tubular spool-journal, a tensioning spring therein, a relatively long and narrow spool-securing member provided with means securing it to the tensioning spring and adapted to be held by the latter alternately in position to receive a spool and in position to secure the spool on the spool-journal, and means on the spool-journal to cooperate with said relatively long and narrow member for tensioning the spool in the manner specified.

3. The structure defined by claim 2, the last said means including a spring around said spool-journal and being compressible longitudinally thereof and adapted to press a spool against said spool-securing member.

In testimony whereof I affix my signature.

CHARLES R. KEEFER.